US012586567B1

(12) United States Patent　　　(10) Patent No.:　US 12,586,567 B1
Kulshreshtha et al.　　　　　　　(45) Date of Patent:　Mar. 24, 2026

(54) MULTI-DOMAIN FINE-TUNING FOR CONTEXTUAL ADAPTERS OF AUTOMATIC SPEECH RECOGNITION

(71) Applicant: Amazon Technologies, Inc., Seattle, WA (US)

(72) Inventors: Devang Kulshreshtha, Montreal (CA); Saket Dingliwal, Kirkland, WA (US); Brady Houston, Bothell, WA (US); Sravan Babu Bodapati, Fremont, CA (US); Srikanth Ronanki, San Jose, CA (US); Jeffrey John Farris, Crystal Lake, IL (US); Vivek Govindan, Black Diamond, WA (US); Katrin Kirchhoff, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 326 days.

(21) Appl. No.: 18/345,754

(22) Filed: Jun. 30, 2023

(51) Int. Cl.
　　*G10L 15/28*　　　(2013.01)
　　*G10L 15/06*　　　(2013.01)
(52) U.S. Cl.
　　CPC ............ *G10L 15/063* (2013.01); *G10L 15/28* (2013.01); *G10L 2015/0638* (2013.01)
(58) Field of Classification Search
　　CPC .................................................. G10L 15/063
　　USPC ........................................................ 704/232
　　See application file for complete search history.

(56) References Cited

U.S. PATENT DOCUMENTS

| | | | |
|---|---|---|---|
| 7,275,034 B2 | 9/2007 | Odell | |
| 11,335,321 B2 * | 5/2022 | Jia ........................... | G10L 13/04 |
| 12,136,414 B2 * | 11/2024 | Thomas .............. | G10L 15/1815 |
| 2006/0184365 A1 * | 8/2006 | Odell ..................... | G10L 15/063 |
| | | | 704/235 |
| 2013/0090921 A1 * | 4/2013 | Liu .......................... | G10L 15/22 |
| | | | 704/10 |
| 2016/0329046 A1 * | 11/2016 | Gross ...................... | G10L 17/04 |
| 2017/0178624 A1 * | 6/2017 | Friedland ................ | G10L 15/22 |
| 2017/0221486 A1 * | 8/2017 | Kurata .................... | G10L 13/00 |

(Continued)

OTHER PUBLICATIONS

R. Singh, H. Yadav, M. Sharma, S. Gosain and R. R. Shah, "Automatic Speech Recognition for Real Time Systems," 2019 IEEE Fifth International Conference on Multimedia Big Data (BigMM), Singapore, 2019, pp. 189-198, doi: 10.1109/BigMM. 2019.00-26. keywords: {Hidden Markov models;Acoustics;Mathematical m (Year: 2019).*

(Continued)

*Primary Examiner* — Bharatkumar S Shah
(74) *Attorney, Agent, or Firm* — S. Scott Foster; Kowert, Hood, Munyon, Rankin & Goetzel, P.C.

(57)　　　　　　ABSTRACT

Multi-stage fine-tuning for customizing automatic speech recognition with contextual adapters is performed. Entities to customize automatic speech recognition are received and used in an automatic speech recognition pipeline with a fine-tuned version of a speech recognition machine learning model and a fine-tuned version of a contextual adapter. The speech recognition machine learning model and the contextual adapter are fine-tuned in stages that include an initial stage that fine-tunes the speech recognition machine learning model using training data that includes multiple domains and subsequent tuning stages that freeze the speech recognition machine learning model while tuning the contextual adapter and tune the speech recognition machine learning model again.

20 Claims, 8 Drawing Sheets

(56) References Cited

U.S. PATENT DOCUMENTS

| | | | | |
|---|---|---|---|---|
| 2020/0175961 A1* | 6/2020 | Thomson | .............. | G10L 15/063 |
| 2023/0045408 A1* | 2/2023 | Thiagarajan | ........... | G06N 5/043 |
| 2024/0017406 A1* | 1/2024 | Kim | ........................ | B25J 13/08 |
| 2024/0153484 A1* | 5/2024 | Rosenberg | ........... | G10L 13/047 |

OTHER PUBLICATIONS

R. Singh, H. Yadav, M. Sharma, S. Gosain and R. R. Shah, "Automatic Soeech Recognition for Real Time Systems," 2019 IEEE Fifth International Conference on Multimedia Big Data (BigMM), Singapore, 2019, pp. 189-198, doi: 10.1109/BigMM. 2019.00-26. keywords: {Hidden Markov models;Acoustics; Mathematical (Year: 2019).*

J. Liao et al., "Generating Human Readable Transcript for Automatic Speech Recognition with Pre-Trained Language Model," ICASSP 2021—2021 IEEE International Conference on Acoustics, Speech and Signal Processing (ICASSP), Toronto, ON, Canada, 2021, pp. 7578-7582, doi: 10.1109/ICASSP39728.2021.941462 (Year: 2021).*

T. N. Sainath, R. Prabhavalkar, S. Kumar, S. Lee, A. Kannan, D. Rybach, V. Schogol, P. Nguyen, B. Li, Y. Wu et al., "No need for a lexicon? evaluating the value of the pronunciation lexica in end-to-end models," in 2018 IEEE International Conference on Acoustics, Speech and Signal Processing (ICASSP). IEEE, 2018, pp. 5859-5863 (retrieved from ArXiv preprint: arXiv:1712.01864v1, 2017, pp. 1-5).

T. Bruguier, F. Peng, and F. Beaufays, "Learning personalized pronunciations for contact names recognition," Interspeech 2016, pp. 1-5.

D. Le, G. Keren, J. Chan, J. Mahadeokar, C. Fuegen, and M. L. Seltzer, "Deep shallow fusion for rnn-t personalization," in 2021 IEEE Spoken Language Technology Workshop (SLT). IEEE, 2021, pp. 251-257 (retrieved from arXiv preprint: arXiv:2011.07754v1, 2020, pp. 1-7).

A. Kannan, Y. Wu, P. Nguyen, T. N. Sainath, Z. Chen, and R. Prabhavalkar, "An analysis of incorporating an external language model into a sequence-to-sequence model," in 2018 IEEE International Conference on Acoustics, Speech and Signal Processing (ICASSP). IEEE, 2018, pp. 1-5828 (retrieved from arXiv preprint: arXiv:1712.01996v1, 2017, pp. 1-5).

N. Das, D. H. Chau, M. Sunkara, S. Bodapati, D. Bekal, and K. Kirchhoff, "Listen, know and spell: Knowledge-infused subword modeling for improving asr performance of oov named entities," in ICASSP 2022-2022 IEEE International Conference on Acoustics, Speech and Signal Processing (ICASSP). IEEE, 2022, pp. 7887-7891.

"A. Gourav, L. Liu, A. Gandhe, Y. Gu, G. Lan, X. Huang, S. Kalmane, G. Tiwari, D. Filimonov, A. Rastrow et al., "Personalization strategies for end-to-end speech recognition systems," in ICASSP 2021-2021 IEEE International Conference on Acoustics, Speech and Signal Processing (ICASSP). IEEE, 2021, pp. 7348-7352 (retrieved from arXiv:2102.07739v1)."

K. M. Sathyendra, T. Muniyappa, F.-J. Chang, J. Liu, J. Su, G. P. Strimel, A. Mouchtaris, and S. Kunzmann, "Contextual adapters for personalized speech recognition in neural transducers," in ICASSP 2022-2022 IEEE International Conference on Acoustics, Speech and Signal Processing (ICASSP). IEEE, 2022, pp. 8537-8541.

G. Pundak, T. N. Sainath, R. Prabhavalkar, A. Kannan, and D. Zhao, "Deep context: end-to-end contextual speech recognition," in 2018 IEEE spoken language technology workshop (SLT). IEEE, 2018, pp. 418-425 (retrieved from arXiv:1808.02480v1).

A. Bruguier, R. Prabhavalkar, G. Pundak, and T. N. Sainath, "Phoebe: Pronunciation-aware contextualization for end-to-end speech recognition," in ICASSP 2019-2019 IEEE International Conference on Acoustics, Speech and Signal Processing (ICASSP). IEEE, 2019, pp. 6171-6175.

I J. Salazar, K. Kirchhoff, and Z. Huang, "Self-attention networks for connectionist temporal classification in speech recognition," in ICASSP 2019-2019 IEEE international conference on acoustics, speech and signal processing (icassp). IEEE, 2019, pp. 7115-7119 (retrieved from arXiv:1901.10055v2).

S. Dingliwal, M. Sunkara, S. Ronanki, J. Farris, K. Kirchhoff, and S. Bodapati, "Personalization of ctc speech recognition models," in 2022 IEEE Spoken Language TechnologyWorkshop (SLT). IEEE, 2023, pp. 302-309 (retrieved from arXiv:2210.09510v3, 2022).

V. Pratap, A. Sriram, P. Tomasello, A. Hannun, V. Liptchinsky, G. Synnaeve, and R. Collobert, "Massively Multilingual ASR: 50 Languages, 1 Model, 1 Billion Parameters," No. iv, 2020. [Online]. Available: http://arxiv.org/abs/2007.03001, pp. 1-5.

J. Cho, M. K. Baskar, R. Li, M. Wiesner, S. H. Mallidi, N. Yalta, M. Karafiat, S. Watanabe, and T. Hori, "Multilingual Sequenceto-Sequence Speech Recognition: Architecture, Transfer Learning, and Language Modeling," 2018 IEEE Spoken Language Technology Workshop, SLT 2018—Proceedings, No. 1, pp. 521-527, added to IEEE 2019.

S. Dalmia, R. Sanabria, F. Metze, and A. W. Black, "Sequence-based multi-lingual low resource speech recognition," in 2018 IEEE International Conference on Acoustics, Speech and Signal Processing (ICASSP), 2018, pp. 4909-4913 (retrieved from arXiv:1802. 07420v1).

A. Gulati, J. Qin, C.-C. Chiu, N. Parmar, Y. Zhang, J. Yu, W. Han, S. Wang, Z. Zhang, Y. Wu et al., "Conformer: Convolutionaugmented transformer for speech recognition," arXiv preprint arXiv:2005. 08100, 2020, pp. 1-5.

A. Graves, S. Fern'andez, F. Gomez, and J. Schmidhuber, "Connectionist temporal classification: labelling unsegmented sequence data with recurrent neural networks," in Proceedings of the 23rd international conference on Machine learning, 2006, pp. 369-376.

S. Toshniwal, T. N. Sainath, R. J. Weiss, B. Li, P. Moreno, E. Weinstein, and K. Rao, "Multilingual Speech Recognition with a Single End-to-End Model," ICASSP, IEEE International Conference on Acoustics, Speech and Signal Processing—Proceedings, vol. Apr. 2018, pp. 4904-4908, 2018 (retrieved from arXiv:1711. 01694v1, 2017).

B. Houston and K. Kirchhoff, "Exploration of language-specific self-attention parameters for multilingual end-to-end speech recognition," in 2022 IEEE Spoken Language Technology Workshop (SLT). IEEE, 2023, pp. 755-762.

S.Watanabe, T. Hori, S. Karita, T. Hayashi, J. Nishitoba, Y. Unno, N. E. Y. Soplin, J. Heymann, M. Wiesner, N. Chen et al., "Espnet: End-to-end speech processing toolkit," arXiv preprint arXiv:1804. 00015, pp. 1-5, 2018.

* cited by examiner

FIG. 4

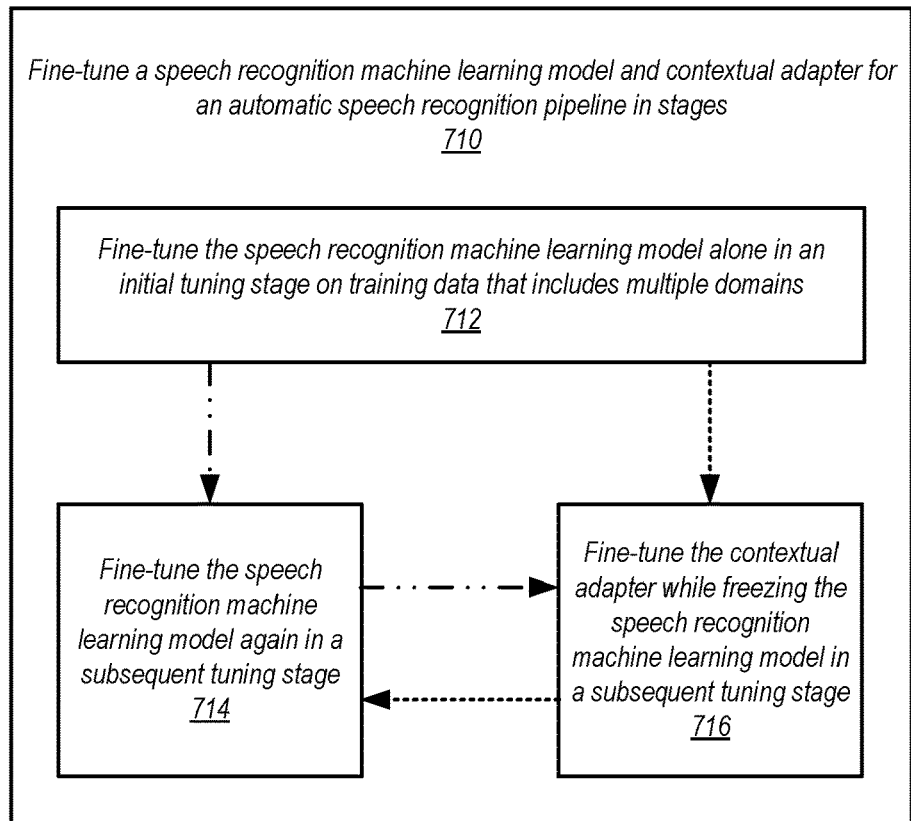

Fine-tune a speech recognition machine learning model and contextual adapter for an automatic speech recognition pipeline in stages
710

Fine-tune the speech recognition machine learning model alone in an initial tuning stage on training data that includes multiple domains
712

Fine-tune the speech recognition machine learning model again in a subsequent tuning stage
714

Fine-tune the contextual adapter while freezing the speech recognition machine learning model in a subsequent tuning stage
716

Receive entities in a domain to adapt the automatic speech recognition system
720

Execute an automatic speech recognition pipeline on given audio data to generate a text for speech in the audio data, the automatic speech recognition pipeline including the fine-tuned version of a general speech recognition machine learning model that generates an initial version of the text provided to the fine-tuned version of a contextual adapter for the domain and final version of the text based on a respective attention scores for the plurality of entities received from the fine-tuned version of the contextual adapter for the domain
730

FIG. 7

MULTI-DOMAIN FINE-TUNING FOR CONTEXTUAL ADAPTERS OF AUTOMATIC SPEECH RECOGNITION

BACKGROUND

Automatic speech recognition (ASR) has now become tightly integrated with daily life through commonly used real-world applications such as digital assistants, news transcription and AI-based interactive voice response telephony. These real-world applications may include many different environments. In order to perform well in these different environments, ASR may have to adapt the ways in which transcripts are generated.

BRIEF DESCRIPTION OF THE DRAWINGS

FIG. 4 illustrates a logical block diagram of different stages of multi-domain fine-tuning for a multi-domain contextual adapter of automatic speech recognition, according to some embodiments.

FIG. 7 illustrates a high-level flowchart of various methods and techniques to implement multi-domain fine-tuning for contextual adapters of automatic speech recognition, according to some embodiments.

Figure 1:
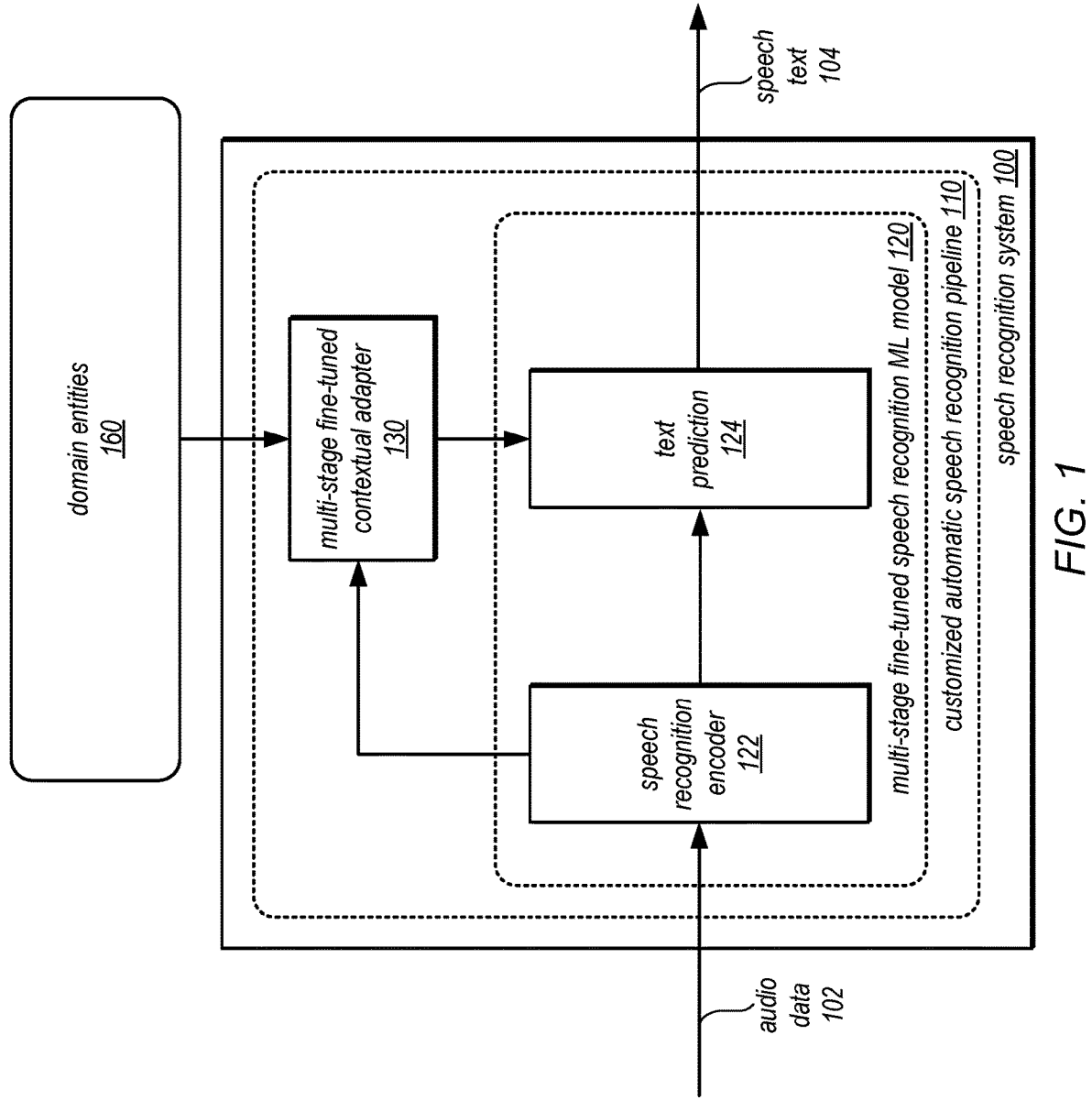
FIG. 1 illustrates a logical block diagram of multi-domain fine-tuning for contextual adapters of automatic speech recognition, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for multi-domain fine-tuning for contextual adapters of automatic speech recognition are described herein. Automatic speech recognition (ASR) models may be implemented in a wide variety of use cases. In some use cases, it may be desirable to customize application of ASR pipelines to perform speech recognition for different domains (e.g., knowledge domains, such as various scientific fields, professional fields like medicine or law, or natural language domains, such as different human languages and dialects (e.g., English, Spanish, Chinese, French etc.). In various embodiments, contextual adapters may be added to an ASR system to bias or otherwise guide the output of the ASR system to a set of provided in entities in a domain. However, to train efficiently, contextual adapters can require thousands of hours of paired audio and text data to train efficiently. For low-resource domains, such as languages like Indic (Telegu, Malayalam, Marathi etc.), Romance (e.g., Portugese, Italian etc.) languages, the paired data available for training may be small (e.g., less than 1000 hrs). For low-resource domains, performance of contextual adapters may suffer. However, multi-domain fine-tuning techniques, as discussed in detail below, may provide for improved performance of contextual adapters for low resource domains. In this way, these multi-domain fine-tuning techniques may support customization across a wide variety of domains, improving the accuracy of base models for automatic recognition systems as contextual adapters can be tuned jointly with the base ASR models. Moreover, data collection costs can be reduced or eliminated, as low resource domains can still support entities for customization in the low resource domains.

FIG. 1 illustrates a logical block diagram of multi-domain fine-tuning for contextual adapters of automatic speech recognition, according to some embodiments. Speech recognition system 100 may be a standalone speech recognition system, or implemented as part of another system or application that utilizes recognized speech, such as natural language processing service 210 implemented as part of a provider network. Speech recognition system 100 may obtain audio data 102 (e.g., captured via an audio sensor, such as a microphone or other audio capture device) and generate a speech text 104 that is a text prediction of words spoken in a human language in the audio data as a response and/or for further natural language processing tasks.

Speech recognition system 100 may implement techniques for multi-domain fine-tuning for contextual adapters of automatic speech recognition, in various embodiments. For example, the audio data 102 may be processed at a customized automatic speech recognition pipeline 110 that includes a multi-stage fine-tuned speech recognition ML model 120, such as an non-autoregressive ASR model like an end-to-end Connectionist Temporal Classification (CTC) style model, or, in some embodiments, an autoregressive model, such as Recurrent Neural Network Transducer (RNN-T) or attention-based encoder-decoder (AED). Such multi-stage fine-tuned speech recognition models 120 can include both a speech recognition encoder 122 and text prediction 124 stage which may make use of multi-stage fine-tuned contextual adapter 130, which can be provide context from domain entities 160 as respective attention scores for the different entities in an initial text prediction from encoder 122. Text prediction 124 may then output token predictions (where a token corresponds to part of a word, a word, or multiple words in a language) that are in the speech in the audio data, wherein the combined token predictions makeup the prediction of speech recognized in the audio data. As indicated 104, the speech text may be provided (e.g., to downstream tasks or as a response back to a request).

As discussed in detail below with regard to FIGS. 4-7, various different tuning stage orderings may performed in order to improve the performance of contextual adapter 130. For example, a target domain specific context adapter may be used as a result of the fine-tuning techniques in FIG. 5, whereas a multi-domain contextual adapter may be used as a result of the fine-tuning techniques in FIG. 4. Other contextual adapter optimizations may include the use of supervision loss, as discussed below with regard to FIG. 4 and performing pre-training on the contextual adapter, as discussed below with regard to FIG. 6.

Please note that the previous description of multi-domain fine-tuning for contextual adapters of automatic speech recognition is a logical illustration and thus is not to be construed as limiting as to the implementation of a speech recognition system.

This specification continues with a general description of a provider network that implements multiple different services, including a natural language processing service, which may implement multi-domain fine-tuning for contextual adapters of automatic speech recognition. Then various examples of, including different components/modules, or arrangements of components/module that may be employed as part of implementing the services are discussed. A number of different methods and techniques to implement multi-domain fine-tuning for contextual adapters of automatic speech recognition are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
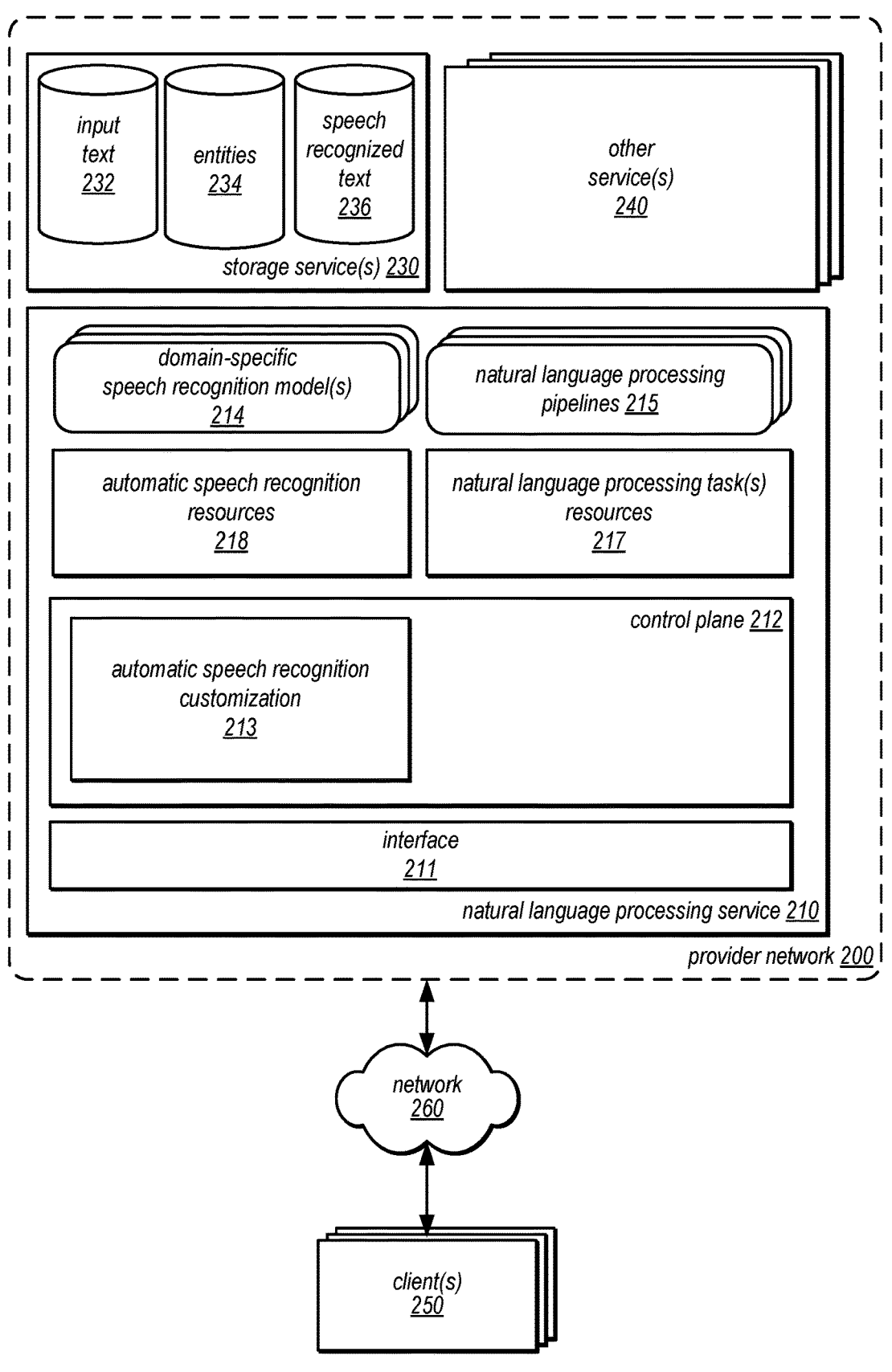
FIG. 2 illustrates an example provider network that may implement natural language processing service that implements multi-domain fine-tuning for contextual adapters of automatic speech recognition, according to some embodiments., according to some embodiments.

FIG. 2 illustrates an example provider network that may implement natural language processing service that implements multi-domain fine-tuning for contextual adapters of automatic speech recognition, according to some embodiments., according to some embodiments. Provider network 200 may be a private or closed system or may be set up by an entity such as a company or a public sector organization to provide one or more services (such as various types of cloud-based storage) accessible via the Internet and/or other networks to clients 250, in one embodiment. Provider network 200 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and services offered by the provider network 200, in one embodiment. In some embodiments, provider network 200 may implement various computing resources or services, such as natural language processing service 210, storage service(s) 230, and/or any other type of network-based services 240 (which may include a virtual compute service and various other types of storage, database or data processing, analysis, communication, event handling, visualization, data cataloging, data ingestion (e.g., ETL), and security services), in some embodiments.

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below, in one embodiment. In various embodiments, the functionality of a given system or service component (e.g., a component of natural language processing service 210 may be implemented by a particular node or may be distributed across several nodes. In some embodiments, a given node may implement the functionality of more than one service system component (e.g., more than one data store component).

Natural language processing service 210 may implement interface 211 to allow clients (e.g., client(s) 250 or clients implemented internally within provider network 200, such as a client application hosted on another provider network service like an event driven code execution service or virtual compute service) to send requests to perform natural language processing tasks, including natural language processing tasks that include automatic speech recognition on audio data. In at least some embodiments, natural language processing service 210 may support various types of natural language processing tasks, including transcription, translation, voice command or speech-based events, in some embodiments. For example, natural language processing service 210 may implement interface 211 (e.g., a graphical user interface, programmatic interface that implements Application Program Interfaces (APIs) and/or a command line interface) may be implemented so that a client application can create or otherwise manage domain-specific speech recognition models 214, natural language processing pipelines 215, and/or input text 232, custom entities 234, or speech recognized text 236 stored in storage service(s) 230, or other storage locations or sources within provider network 200 or external to provider network 200 (e.g., on premise data storage in private networks).

Natural language processing service 210 may implement a control plane 212 to perform various control operations to implement the features of natural language processing service 210. For example, control plane 212 may monitor the health and performance of requests at different components of automatic speech recognition resources 218 and natural language processing tasks resources (e.g., the health or performance of various nodes, instances, servers, or other computing resources implementing these features of natural language processing service 210). If a node fails, a request fails, or other interruption occurs, control plane 212 may be able to restart a job to complete a request (e.g., instead of sending a failure response to the client). Control plane 212 may, in some embodiments, may arbitrate, balance, select, or dispatch requests to different node(s) in various embodiments. For example, control plane 212 may receive requests interface 211 which may be a programmatic interface, and identify an available computing to begin work on the request.

Automatic speech recognition resources 218 may be various computing resources that host speech recognition models 214 and accept audio data for performing ASR tasks to generate speech predictions, similar to speech recognition system 100 discussed above with regard to FIG. 1. Similarly, natural language processing task(s) resources 217 may be various computing resources that host various other machine learning models, applications, or other features that perform natural language processing tasks.

Data storage service(s) 230 may implement different types of data stores for storing, accessing, and managing data on behalf of clients 250 as a network-based service that enables clients 250 to operate a data storage system in a cloud or network computing environment. Data storage service(s) 230 may also include various kinds relational or non-relational databases, in some embodiments. Data storage service(s) 230 may include object or file data stores for putting, updating, and getting data objects or files, in some embodiments. Data storage service(s) 230 may be accessed via programmatic interfaces (e.g., APIs) or graphical user interfaces. Input text 232, speech recognized text 234, or NLP processed text 236 may be put and/or retrieved from data storage service(s) 230 via an interface for data storage services 230, in some embodiments.

Generally speaking, clients 250 may encompass any type of client that can submit network-based requests to provider network 200 via network 260, including requests for natural language processing service 210 (e.g., a request to process audio data in a natural language processing pipeline 215). For example, a given client 250 may include a suitable version of a web browser, or may include a plug-in module or other type of code module that can execute as an extension to or within an execution environment provided by a web browser. Alternatively, a client 250 may encompass an application (or user interface thereof), a media application, an office application or any other client application that may make use of natural language processing service 210 (or other provider network 200 services) to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. Clients 250 may convey network-based services requests (e.g., requests to interact with services like machine translation service 210) via network 260, in one embodiment. In various embodiments, network 260 may encompass any suitable combination of networking hardware and protocols necessary to establish network-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks, in one embodiment. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

Figure 3:
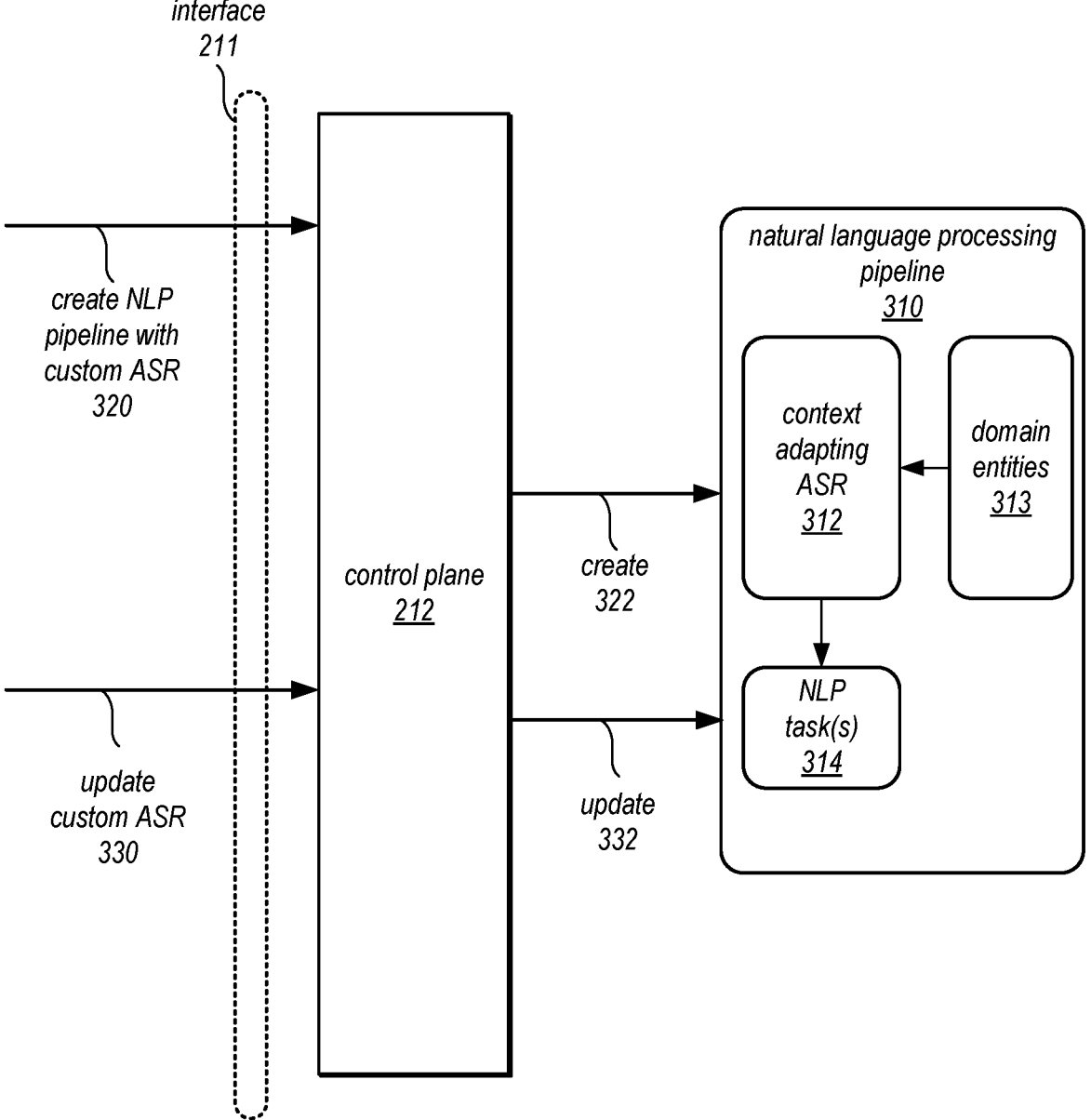
FIG. 3 illustrates a logical block diagram of different interactions to create and update a natural language processing pipeline with custom automatic speech recognition, according to some embodiments.

As noted above, natural language processing service 210 may implement natural language processing pipelines 215 which may include custom ASR as well as other natural language processing tasks. FIG. 3 illustrates a logical block diagram of different interactions to create and update a natural language processing pipeline with custom automatic speech recognition, according to some embodiments. Interface 211 may support various requests to control plane 212 on behalf of different users, accounts, or jobs, in some embodiments. For example, a create NLP pipeline with custom ASR request 320 may be submitted. The create NLP pipeline request 320 may identify the custom domain entities for customization of the ASR model (as well as various other machine learning models, tools, or applications that can perform downstream NLP tasks (e.g., commands, translations, or various other NLP processing on speech predictions generated by context adapting ASR model 312).

Control plane 212 may create 322 (e.g., as a template, executable code or scripts, or other format), natural language processing pipeline 310 as specified by request 320, in some embodiments. For example, the identifier for context adapting ASR model 312 may be included along with the requested NLP task(s) 314 in the request. As discussed in detail below, domain entities 313 may be used to inform a context adapter of context adapting ASR 312. In some embodiments, updates 330 to context adapting ASR 330 may be made. For example, the update 332 may be made to include additional custom entities.

Figure 4:
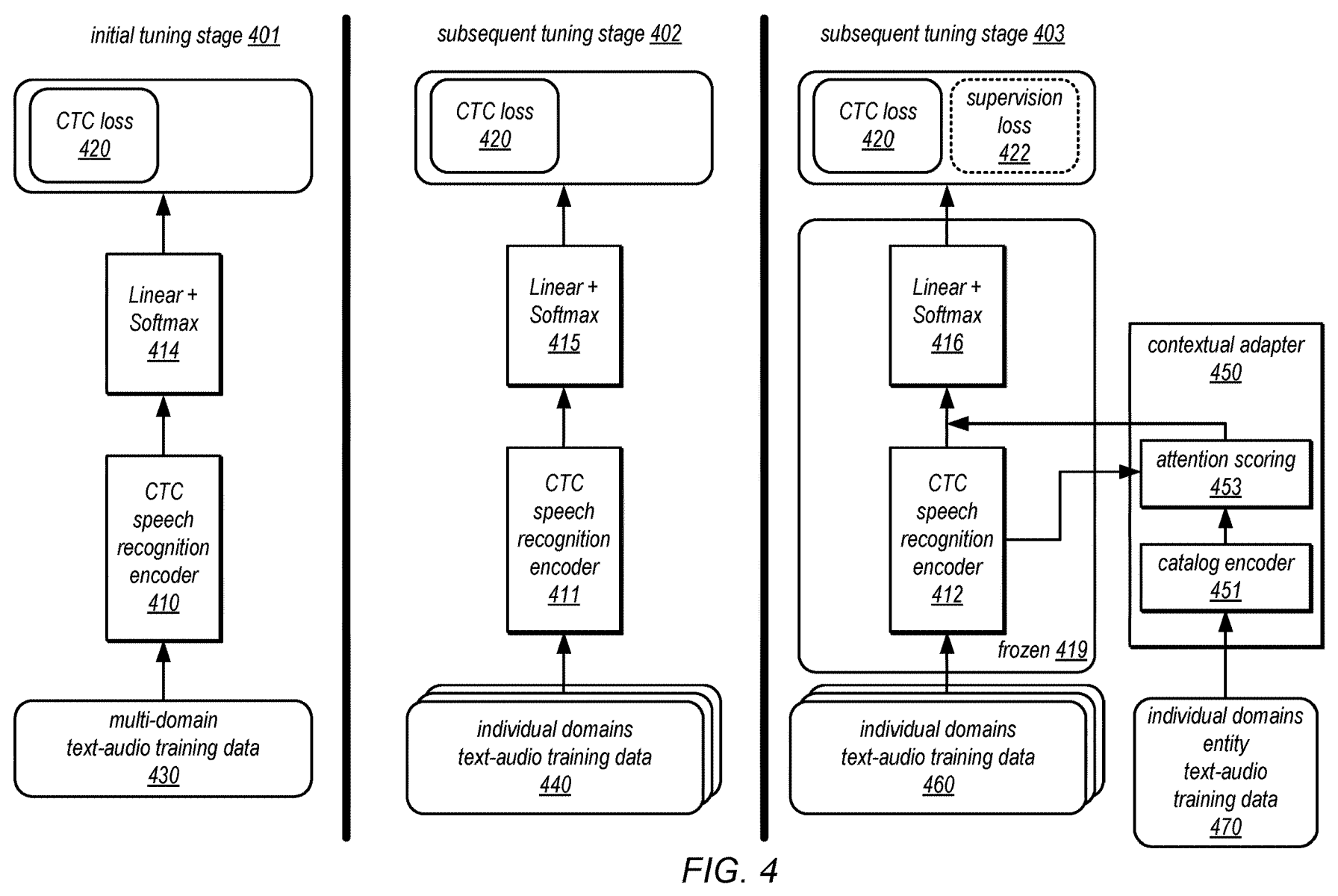

FIG. 4 illustrates a logical block diagram of different stages of multi-domain fine-tuning for a multi-domain contextual adapter of automatic speech recognition, according to some embodiments. As indicated at 401, an initial tuning stage may be performed on the speech recognition model that includes a Connectionist Temporal Classification (CTC) encoder 410 and corresponding linear classification and softmax layers 414 which produce predicted text. The CTC encoder 410 and linear+softmax layers 414 may be trained using multi-domain text-audio training data 430 using a CTC loss function 420. For example, multi-domain text-audio training data 430 may include various domains, including high and low resource domains (e.g., common natural languages and less common natural languages).

As indicated at subsequent tuning stage 402, further fine tuning may be performed again on the initially tuned model (CTC speech recognition encoder 411 and linear+softmax layers 415, using separate individual domains with text-audio training data 440, in some embodiments. Again, CTC loss 420 may be used to update CTC speech recognition encoder 411 and linear+softmax layers 415.

As indicated at subsequent tuning stage 403, further fine tuning may be performed that utilizes contextual adapter 450. Contextual adapter 450 may include catalog encoder 451, which at inference time takes the received entities for customization. At training time, individual domains entity training data 470 that includes both text and audio may be used, along with individual domains text-audio training data 460 to train contextual adapter 450 (e.g., training catalog encoder and attention scoring 453). At tuning stage 403, the speech recognition model portion's output may be used for tuning, but the model components, CTC speech recognition encoder 412 and linear+softmax layers 416) may be frozen, as indicated at 419, and thus may not be updated.

As depicted at 422, a supervision loss 422 may also be used in some embodiments. For example, some approaches for training attention-based modules for customization, such as a curriculum learning based approach that slowly increases the size of the entity word list (e.g., K) during training, adding a special suffix to each entity word in the ground truth, and using separate labeled data for training the Contextual Adapters and the CTC model. However, they optimize $L_{etc}$ for training the attention scorer's parameters. This loss does not explicitly capture the problem of choosing the right entity word and boosting the corresponding sub-word sequence. In various embodiments, supervision loss 422 may provide an adapter-specific loss function to train the contextual adapters, which is added to the CTC loss, and then jointly optimized as a multi-task objective. For a training sample, at any time-step t∈T, attention weight of any entity word $w_k$, k∈K in the Contextual Adapters is the normalized dot product between the encoder output at that time step t (query) and the catalog encoder output for $w_k$ (key). Let $W_{(nb)}^t$, $W_k^t$ be the attention weight given to a no-bias token, ⟨nb⟩ token, and the word $w_k$ at time step t respectively. These attention weights may be used to directly predict the right entity word from the list. A K-class cross-entropy loss (CE loss) as defined in Eq. 1 below may be added. This loss may be added only for those time-frames in the input audio where the entity word was spoken. Therefore, for all other audio frames, the attention given to the ⟨nb⟩ token may be maximized, and hence, the time frames may be weighted in an inverse proportion to $W_{(nb)}$:

$$\mathcal{L}_{CE}(.) = -\sum_{t=1}^{T}\left(1 - W_{(n,b)}^t\right)\log\left(\sigma(W_{k'}^t)\right) \quad (1)$$

where k' is the index of the correct word e.g., $w_k=w^{boost}$ and σ(•) is the Softmax function over all the attention weights $W_k^t$, k∈K. Finally, for training Contextual Adapters with limited paired text and audio data, a weighted combination of the two losses may be minimized (e.g., $L_{net}=L_{CTC}-\alpha L_{CE}$).

Figure 5:
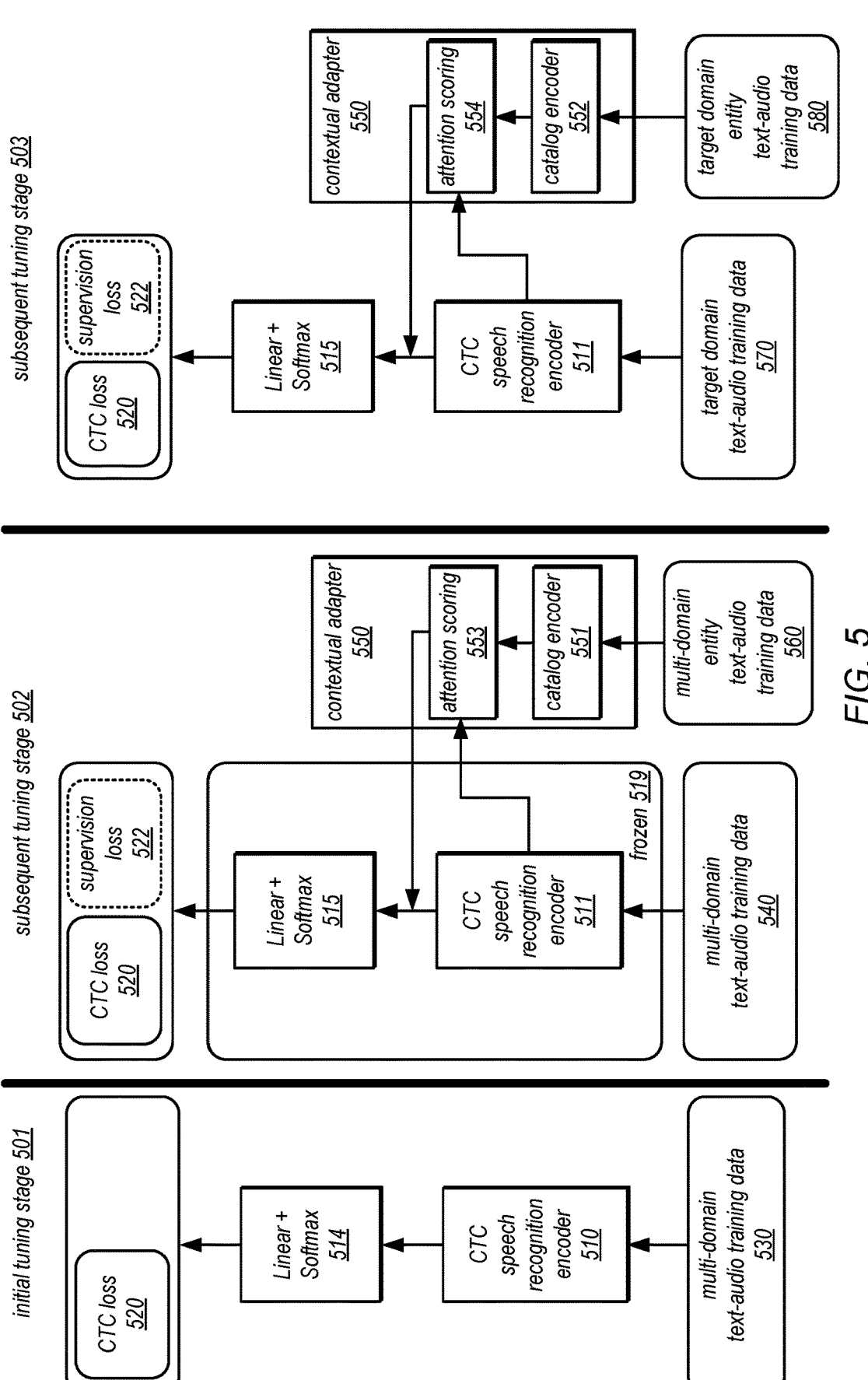
FIG. 5 illustrates a logical block diagram of multi-domain fine-tuning for a target domain contextual adapter of automatic speech recognition, according to some embodiments.

FIG. 5 illustrates a logical block diagram of multi-domain fine-tuning for a target domain contextual adapter of automatic speech recognition, according to some embodiments. As indicated at 501, an initial tuning stage may be performed on the speech recognition model that includes a Connectionist Temporal Classification (CTC) encoder 510 and corresponding linear classification and softmax layers 514 which produce predicted text. The CTC encoder 510 and linear+softmax layers 514 may be trained using multi-domain text-audio training data 530 using a CTC loss function 520. For example, multi-domain text-audio training data 530 may include various domains, including high and low resource domains (e.g., common natural languages and less common natural languages).

As indicated at subsequent tuning stage 502, further fine tuning may be performed using the initially tuned model (CTC speech recognition encoder 511 and linear+softmax layers 515 frozen, as indicated at 519, to fine-tune catalog encoder 551 and attention scoring 553 of contextual adapter 550 using multi-domain text-audio training data 540 and multi-domain entity text-audio training data 560, in some embodiments. CTC loss 520 may be used to update attention scoring 553 and catalog encoder 551 of contextual adapter as well as supervision loss 522, in some embodiments, as discussed above.

As indicated at subsequent tuning stage 503, further fine tuning may be performed that fine tones both the speech recognition model, CTC speech recognition encoder 511 and linear+softmax layers 515, and contextual adapter 550. Contextual adapter 550 may include catalog encoder 552, which at inference time takes the received entities for customization and attention scoring 554 which generates respective attention scores for different entities in a text version provided by CTC speech recognition encoder 511. At training time, multi-domain entity training data 570 that includes both text and audio may be used, along with multi-domain text-audio training data 560 to train contextual adapter 550 (e.g., training catalog encoder 552 and attention scoring 554). At tuning stage 503, CTC loss 520 may be applied. In some embodiments, supervision loss 522 may also be applied.

Figure 6:
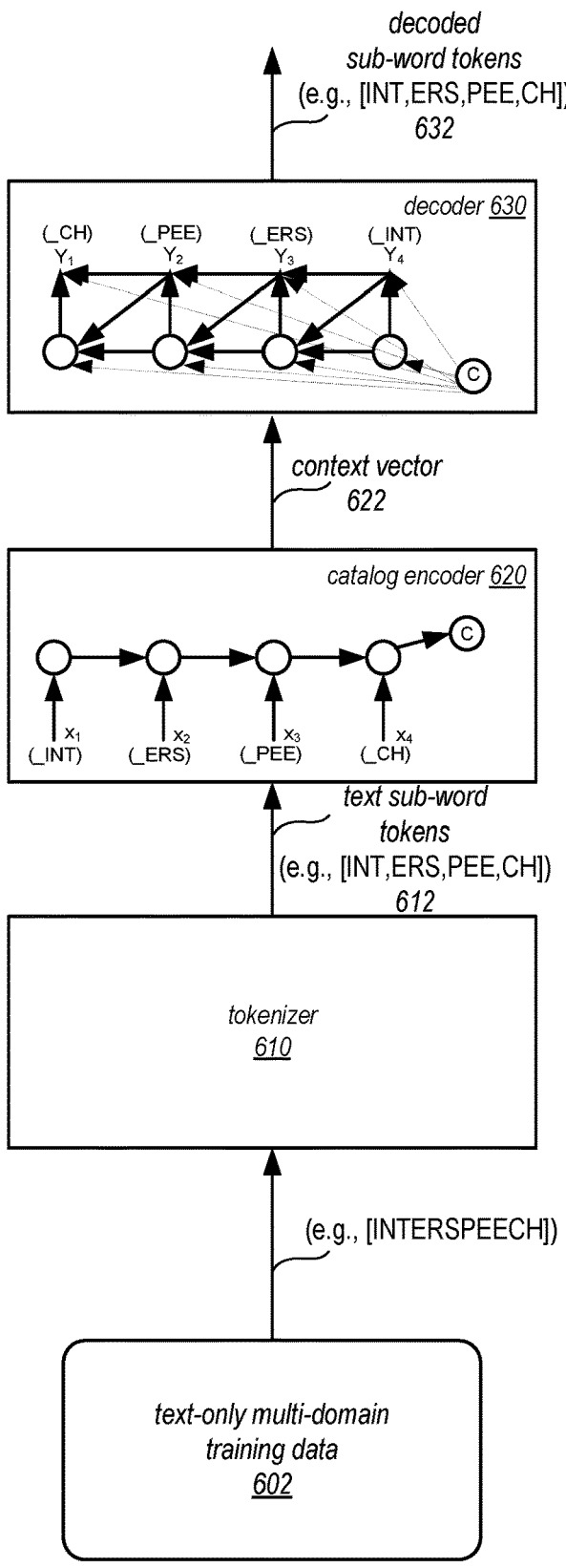
FIG. 6 illustrates a logical block diagram of pre-training a catalog encoder of a contextual adapter of automatic speech recognition, according to some embodiments.

Other optimizations for improving the performance of contextual adapters for automatic speech recognition may be implemented in addition to the fine-tuning techniques discussed above. For example, as illustrated above, contextual adapters may include a catalog encoder that is a text (e.g., language component). For each word in an entity list, the subwords are embedded using an embedding layer. Next, they are passed through further features (e.g., Recurrent Neural Network (RNN)/Long Short-Term Memory (LSTM)) and aggregated to obtain the word representation. Contextual adapters may also include an attention scorer that is an audio (e.g., speech) component. The word representation is input into the attention scoring (sometimes referred to as the attention module), which further processes it and integrates it with the output from the speech recognition model. These features can be further improved through pre-training. FIG. 6 illustrates a logical block diagram of pre-training a catalog encoder of a contextual adapter of automatic speech recognition, according to some embodiments.

For example, in the case of low-resource domains (e.g., less common natural languages), the availability of paired audio-text data may be limited. However, a large amount of unsupervised text-only data may exist in these low-resource domains. To overcome the text-audio scarcity, textual data may be aggregated from multiple domains and employed to pre-train the catalog encoder on a multi-domain corpus. This pre-training process offers potential enhancements for low-resource automatic speech recognition customization, as the contextual adapters gain a deeper understanding of the sub-words specific to low-resource domains encountered during pre-training.

As indicated at 602, text-only multi-domain training data 602 may be obtained and provided to a tokenizer 610, which may, for example, parse the text examples in training data 602, in order to generate text sub-word tokens 612 (e.g., as illustrated using the text "INTERSPEECH"). Catalog encoder 620 may then be used to encode the sub-word tokens into a context vector 622 (which may be also used, as discussed above, to provide attention scores for individual entities for guiding speech text prediction). Context vector 622 may then be decoded at decoder 630 and the resulting decoded sub-word tokens 632 be evaluated using a training loss function to make updates to catalog encoder 620. Catalog encoder 620 may be an RNN model and pre-trained according to autoencoder techniques. Once pre-training is complete, catalog encoder 620 may incorporated into a contextual adapter (e.g., contextual adapters 450 or 550 in FIGS. 4 and 5 discussed above). Decoder 630 (and possibly tokenizer 610) may be used only for pre-training purposes and not included in contextual adapters, in some embodiments.

Although FIGS. 2-6 have been described and illustrated in the context of a provider network implementing a natural language processing service, the various components illustrated and described in FIGS. 2-6 may be easily applied to other systems that implement speech recognition, including other services which may provide, for example, transcript generation in response to requests to transcribe audio data, either standalone systems or implemented as a feature of a larger application. As such, FIGS. 2-6 are not intended to be limiting as to other embodiments of multi-domain fine-tuning for contextual adapters of automatic speech recognition.

FIG. 7 illustrates a high-level flowchart of various methods and techniques to implement multi-domain fine-tuning for contextual adapters of automatic speech recognition, according to some embodiments. Various different systems and devices may implement the various methods and techniques described below, either singly or working together. Therefore, the above examples and or any other systems or devices referenced as performing the illustrated method, are not intended to be limiting as to other different components, modules, systems, or devices.

Multi-stage fine-tuning may be performed in different ways in order to ready different automatic speech pipelines with contextual adapters ready for use when entities are received to customize or otherwise adapt an automatic speech recognition system. For example, in some embodiments, a service like natural language processing service 210 or other speech recognition system (e.g., system 100) may support multiple different domains and may select between different automatic speech recognition pipelines that were fine-tuned with different training data and/or using different multi-stage techniques. For example, each domain (e.g., natural languages) could be mapped to one or more versions of an automatic speech recognition system that can provide optimal performance for the entities in a targeted domain. In some embodiments, for example, domain specific contextual adapters may be implemented. If, however, a domain-specific contextual adapter is not available, then a multi-domain contextual adapter could be selected.

As indicated at 710, a speech recognition machine learning model and contextual adapter for an automatic speech recognition pipeline in stages may be fine-tuned in stages, in some embodiments. For example, as indicated at 712, the speech recognition machine learning model may be fine-tuned alone in an initial tuning stage on training data that includes multiple domains, in some embodiments. Different arrangements of subsequent tuning stages, such as fine-tuning the speech recognition model again, as indicated at 716 and fine-tuning the contextual adapter while freezing the speech recognition machine learning model, as indicated at 716, can be performed. For example, techniques similar to those discussed above with regard to FIG. 4 that provide a multi-domain fine-tuned contextual adapter may be represented by the dash-dot-dot arrows between 712, 714, and 716. In another example, a target domain fine-tuned contextual adapter, discussed in detail able with regard to FIG. 5, may be represented by the dotted arrows between 712, 716, and 714.

Additional techniques for fine-tuning may be implemented, in some embodiments. For example, as discussed above with regard to FIGS. 4 and 5, a supervision loss, such as a cross entropy loss, may be further used in addition to an initial loss function for training the speech recognition model (e.g., a CTC loss function for CTC-based speech recognition models). As discussed above with regard to FIG. 6, the contextual adapter may be pre-trained using text-only training data to train a catalog encoder for the contextual adapter.

As indicated at 720, entities may be received in a domain to adapt the automatic speech recognition system, in some embodiments. For example, a request to customize an automatic speech recognition pipeline may be received, in some embodiments, that identifies a location of (or includes in the request) entities in a specified domain (e.g., entities in a target natural language). The request may trigger a deployment workflow, including contextual adapter/automatic speech recognition pipeline selection (e.g., according to the domain which may be specified in the request). The automatic speech recognition pipeline may be initialized with the entities (e.g., via a catalog encoder of the contextual adapter which encodes the entities and provides them for use in attention scoring of a contextual adapter as exemplified in the discussion above with regard to FIGS. 4 and 5), and then be ready to begin performing speech recognition on audio data (which may be sent to or otherwise obtained by the speech recognition system).

For example, as indicated at 730, the automatic speech recognition pipeline may be executed or otherwise used to process given audio data to generate a text for speech in the audio data, in some embodiments. The automatic speech recognition pipeline may include the fine-tuned version of a general speech recognition machine learning model that generates an initial version of the text provided to the fine-tuned version of a contextual adapter for the domain and final version of the text based on a respective attention scores for the plurality of entities received from the fine-tuned version of the contextual adapter for the domain. The text may be provided back as a response (e.g., to a request for a transcription or other speech recognition request or may be provided to downstream processing tasks, such as downstream natural language processing tasks, as discussed above with regard to FIG. 3.

The methods described herein may in various embodiments be implemented by any combination of hardware and software. For example, in one embodiment, the methods may be implemented on or across one or more computer systems (e.g., a computer system as in FIG. 8) that includes one or more processors executing program instructions stored on one or more computer-readable storage media coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
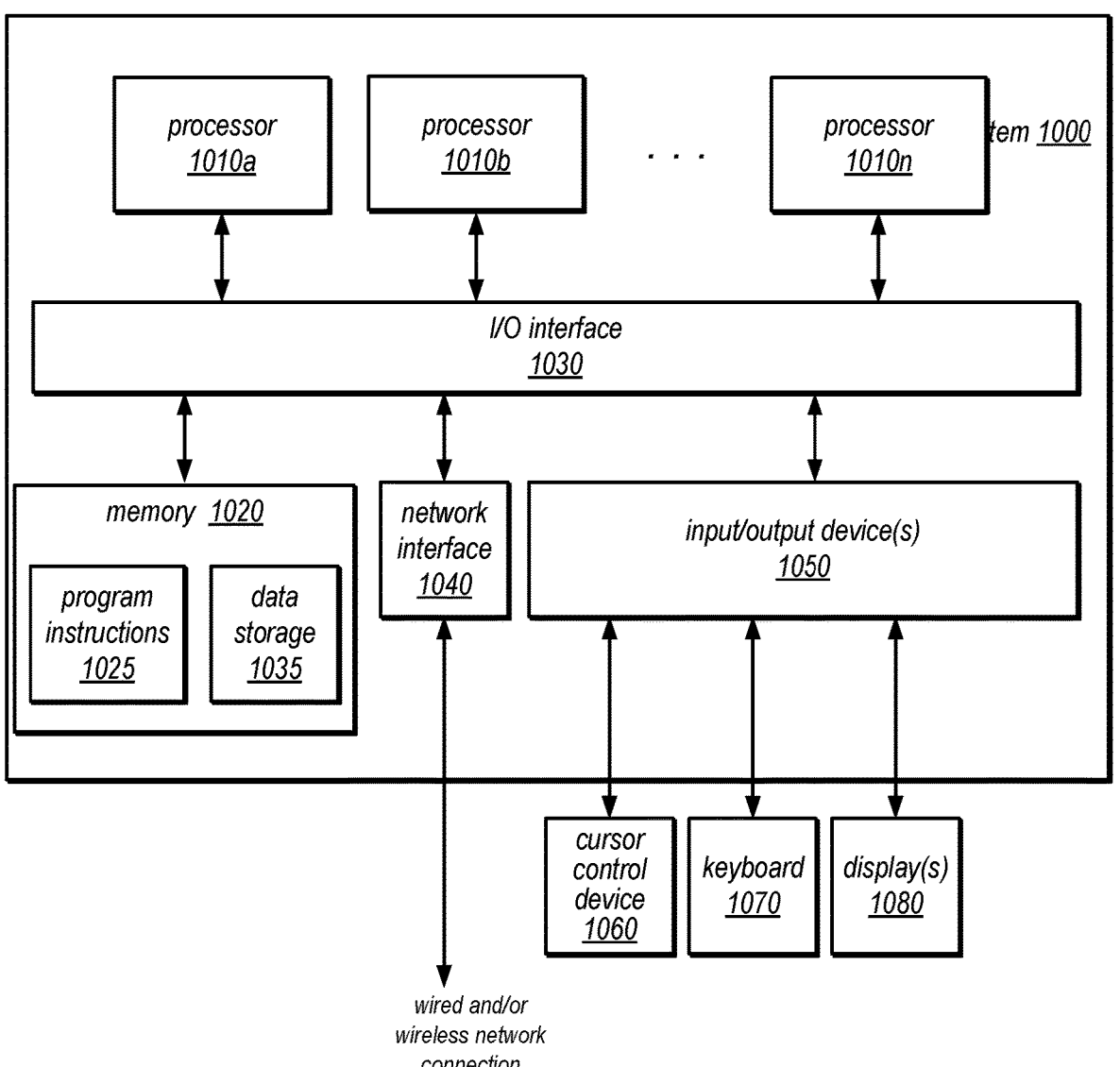
FIG. 8 illustrates an example system to implement the various methods, techniques, and systems described herein, according to some embodiments.

Embodiments of multi-domain fine-tuning for contextual adapters of automatic speech recognition as described herein may be executed on one or more computer systems, which may interact with various other devices. One such computer system is illustrated by FIG. 8. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing device, computing node, compute node, or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions that execute on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as ratio mask post-filtering for audio enhancement as described above are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a non-transitory, computer-readable storage medium may include storage media or memory media such as magnetic or optical media, e.g., disk or CD/DVD-ROM coupled to computer system 1000 via I/O interface 1030. Program instructions and data stored via a computer-readable medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 8, memory 1020 may include program instructions 1025, that implement the various methods and techniques as described herein, including the application of self-supervised training for audio anomaly detection and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a non-transitory, computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

It is noted that any of the distributed system embodiments described herein, or any of their components, may be implemented as one or more web services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the web service in a manner prescribed by the description of the network-based service's interface. For example, the network-based service may describe various operations that other systems may invoke, and may describe a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a web services request, a network-based services client may assemble a message including the request and convey the message to an addressable endpoint (e.g., a Uniform Resource Locator (URL)) corresponding to the web service, using an Internet-based application layer transfer protocol such as Hypertext Transfer Protocol (HTTP).

In some embodiments, web services may be implemented using Representational State Transfer ("RESTful") techniques rather than message-based techniques. For example, a web service implemented according to a RESTful technique may be invoked through parameters included within an HTTP method such as PUT, GET, or DELETE, rather than encapsulated within a SOAP message.

The various methods as illustrated in the FIGS. and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:

at least one processor; and a memory, storing program instructions that when executed by the at least one processor, cause the at least one processor to implement a speech recognition system, configured to:

receive a request to customize an automatic speech recognition pipeline using a plurality of entities;

deploy the customized automatic speech recognition pipeline, wherein the customized automatic speech recognition pipeline is configured to generate a text for speech in received audio data and wherein the customized automatic speech recognition pipeline comprises:

a fine-tuned version of a general speech recognition machine learning model; and a fine-tuned version of contextual adapter for the domain;

wherein the fine-tuned version of the general speech recognition machine learning model generates an initial version of the text provided to the fine-tuned version of the contextual adapter for the domain and final version of the text based on a respective attention scores for the plurality of entities received from the fine-tuned version of the contextual adapter for the domain; and wherein the fine-tuned version of the general speech recognition machine learning model and the fine-tuned version of the contextual adapter were fine-tuned in stages, wherein an initial tuning stage fine-tuned the general speech recognition machine learning model alone on first training data comprising a plurality of domains, including the domain, and wherein subsequent tuning stages fine-tuned the contextual adapter while freezing the general speech recognition machine learning model and fine-tuned the general speech recognition machine learning model again.

2. The system of claim 1, wherein the speech recognition machine learning model is a Connectionist Temporal Classification (CTC) based model trained using a CTC loss function, wherein a stage of the fine-tuning that fine tunes the contextual adapter applies a supervision loss function in addition to the CTC loss function, and wherein the supervision loss function is added for individual audio frames identified as containing one of a plurality of training entities.

3. The system of claim 1, wherein the contextual adapter comprises a catalog encoder that encodes entities for subsequent attention scoring and wherein the contextual adapter is pre-trained using text-only training data comprising examples from different ones of the plurality of domains.

4. The system of claim 1, wherein the speech recognition system is implemented as part of a natural language processing service offered by a provider network, wherein the request to customize the automatic speech recognition pipeline is received via an interface of the natural language processing service, and wherein the text of the speech in the audio data is provided to a downstream natural language processing task performed by the natural language processing service.

5. A method, comprising:

receiving, at a speech recognition system, a plurality of entities in a domain to adapt an automatic speech recognition system; and executing, by the speech recognition system, an automatic speech recognition pipeline on given audio data to generate a text for speech in the audio data, wherein the automatic speech recognition pipeline comprises:

a fine-tuned version of a general speech recognition machine learning model; and a fine-tuned version of contextual adapter for the domain;

wherein the fine-tuned version of the general speech recognition machine learning model generates an initial version of the text provided to the fine-tuned version of the contextual adapter for the domain and final version of the text based on a respective attention scores for the plurality of entities received from the fine-tuned version of the contextual adapter for the domain; and wherein the fine-tuned version of the general speech recognition machine learning model and the fine-tuned version of the contextual adapter were fine-tuned in stages, wherein an initial tuning stage fine-tuned the general speech recognition machine learning model alone on first training data comprising a plurality of domains, including the domain, and wherein subsequent tuning stages fine-tuned the contextual adapter while freezing the general speech recognition machine learning model and fine-tuned the general speech recognition machine learning model again.

6. The method of claim 5, wherein the subsequent tuning stages that fine-tuned the contextual adapter while freezing the general speech recognition machine learning model occurs after the subsequent tuning stages that fine-tuned the general speech recognition machine learning model again.

7. The method of claim 6, wherein the speech recognition machine learning model is a Connectionist Temporal Classification (CTC) based model trained using a CTC loss function, wherein a stage of the fine-tuning that fine tunes the contextual adapter applies a supervision loss function in addition to the CTC loss function, and wherein the supervision loss function is added for individual audio frames identified as containing one of a plurality of training entities.

8. The method of claim 6, wherein the contextual adapter comprises a catalog encoder that encodes entities for subsequent attention scoring and wherein the contextual adapter is pre-trained using text-only training data comprising examples from different ones of the plurality of domains.

9. The method of claim 5, wherein the subsequent tuning stage that fine-tuned the contextual adapter while freezing the general speech recognition machine learning model occurs before the subsequent tuning stage that fine-tuned the general speech recognition machine learning model again and wherein the subsequent tuning stage that fine-tuned the general speech recognition machine learning model again also fine-tuned the contextual adapter together with the general speech recognition machine learning model.

10. The method of claim 9, wherein the speech recognition machine learning model is a Connectionist Temporal Classification (CTC) based model trained using a CTC loss function, wherein a stage of the fine-tuning that fine tunes the contextual adapter applies a supervision loss function in addition to the CTC loss function, and wherein the supervision loss function is added for individual audio frames identified as containing one of a plurality of training entities.

11. The method of claim 9, wherein the contextual adapter comprises a catalog encoder that encodes entities for subsequent attention scoring and wherein the contextual adapter is pre-trained using text-only training data comprising examples from different ones of the plurality of domains.

12. The method of claim 5, wherein the fine-tuned version of the contextual adapter is one of a plurality of different contextual adapters supported by the speech recognition system and wherein the method further comprises selecting the fine-tuned version of the contextual adapter out of the plurality of different contextual adapters for executing as part of the automatic speech recognition pipeline according to the domain.

13. The method of claim 5, wherein the domain is a target natural language of the plurality of entities and wherein the plurality of domains are different respective natural languages including the target natural language.

14. One or more non-transitory, computer-readable storage media, storing program instructions that when executed on or across one or more computing devices cause the one or more computing devices to implement:

receiving a plurality of entities in a domain to adapt an automatic speech recognition system; and causing execution of an automatic speech recognition pipeline on given audio data to generate a text for speech in the audio data, wherein the automatic speech recognition pipeline comprises:

a fine-tuned version of a general speech recognition machine learning model; and a fine-tuned version of contextual adapter for the domain;

wherein the fine-tuned version of the general speech recognition machine learning model generates an initial version of the text provided to the fine-tuned version of the contextual adapter for the domain and final version of the text based on a respective attention scores for the plurality of entities received from the fine-tuned version of the contextual adapter for the domain; and wherein the fine-tuned version of the general speech recognition machine learning model and the fine-tuned version of the contextual adapter were fine-tuned in stages, wherein an initial tuning stage fine-tuned the general speech recognition machine learning model alone on first training data comprising a plurality of domains, including the domain, and wherein subsequent tuning stages fine-tuned the contextual adapter while freezing the general speech recognition machine learning model and fine-tuned the general speech recognition machine learning model again.

15. The one or more non-transitory, computer-readable storage media of claim 14, wherein the subsequent tuning stages that fine-tuned the contextual adapter while freezing the general speech recognition machine learning model occurs after the subsequent tuning stages that fine-tuned the general speech recognition machine learning model again.

16. The one or more non-transitory, computer-readable storage media of claim 15, wherein the contextual adapter comprises a catalog encoder that encodes entities for subsequent attention scoring and wherein the contextual adapter is pre-trained using text-only training data comprising examples from different ones of the plurality of domains.

17. The one or more non-transitory, computer-readable storage media of claim 14, wherein the subsequent tuning stage that fine-tuned the contextual adapter while freezing the general speech recognition machine learning model occurs before the subsequent tuning stage that fine-tuned the general speech recognition machine learning model again and wherein the subsequent tuning stage that fine-tuned the general speech recognition machine learning model again also fine-tuned the contextual adapter together with the general speech recognition machine learning model.

18. The one or more non-transitory, computer-readable storage media of claim 17, wherein the speech recognition machine learning model is a Connectionist Temporal Classification (CTC) based model trained using a CTC loss function, wherein a stage of the fine-tuning that fine tunes the contextual adapter applies a supervision loss function in addition to the CTC loss function, and wherein the supervision loss function is added for individual audio frames identified as containing one of a plurality of training entities.

19. The one or more non-transitory, computer-readable storage media of claim 14, wherein the fine-tuned version of the contextual adapter is one of a plurality of different contextual adapters in different respective automatic speech recognition pipelines and wherein the one or more non-transitory, computer-readable storage media store further program instructions that when executed on or across the one or more computing devices cause the one or more computing devices to further implement selecting the fine-tuned version of the contextual adapter out of the plurality of different contextual adapters for executing as part of the automatic speech recognition pipeline according to the domain.

20. The one or more non-transitory, computer-readable storage media of claim 14, wherein the one or more computing devices are implemented as part of a service offered by a provider network, wherein the audio data is received as part of a request to transcribe the audio data using the automatic speech recognition pipeline received via an interface of the service, and wherein the text in the audio data is provided in response to the request.

\* \* \* \* \*